(12) United States Patent
Zhang et al.

(10) Patent No.: US 10,027,174 B2
(45) Date of Patent: Jul. 17, 2018

(54) RESONANCE-TYPE CONTACTLESS POWER SUPPLY AND POWER RECEIVER

(71) Applicant: Silergy Semiconductor Technology (Hangzhou) Ltd., Hangzhou (CN)

(72) Inventors: Wang Zhang, Hangzhou (CN); Feng Yu, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 100 days.

(21) Appl. No.: 14/752,392

(22) Filed: Jun. 26, 2015

(65) Prior Publication Data

US 2015/0380947 A1 Dec. 31, 2015

(30) Foreign Application Priority Data

Jun. 27, 2014 (CN) .......................... 2014 1 0304391

(51) Int. Cl.
*H01F 27/42* (2006.01)
*H01F 37/00* (2006.01)
(Continued)

(52) U.S. Cl.
CPC .............. *H02J 50/12* (2016.02); *H02J 5/005* (2013.01); *H01F 38/14* (2013.01); *H02J 7/025* (2013.01); *Y02T 90/122* (2013.01)

(58) Field of Classification Search
CPC .. H02J 5/005; H02J 7/025; H02J 50/70; H02J 50/10; H04B 5/0037; H01F 38/14; Y02T 90/122
(Continued)

(56) References Cited

U.S. PATENT DOCUMENTS

2010/0033156 A1* 2/2010 Abe ..................... H02M 3/3378
323/305
2013/0188397 A1* 7/2013 Wu ................... H02M 3/33576
363/17
(Continued)

FOREIGN PATENT DOCUMENTS

CN 104009555 A 8/2014
CN 104065179 A 9/2014

*Primary Examiner* — Rexford Barnie
*Assistant Examiner* — Rasem Mourad
(74) *Attorney, Agent, or Firm* — Westman, Champlin & Koehler, P.A.

(57) ABSTRACT

The present disclosure relates to a resonance-type contactless power supply and a power receiver. A high-frequency power supply provides a high-frequency AC current with a predetermined frequency. A transmitter-side resonant circuit includes a transmitting coil for receiving the high-frequency AC current from the high-frequency power supply. A receiver-side resonant circuit includes a receiving coil which is separated from but coupled to the transmitting coil in contactless manner. The receiver-side resonant circuit receives electric energy from the transmitting coil. A receiver-side parallel capacitor is connected in parallel at an output terminal of the receiver-side resonant circuit. The receiver-side parallel capacitor has a capacitance value which is in inversely proportional to the product of a square of an angular frequency of the predetermined frequency and a predetermined mutual inductance. The predetermined mutual inductance is determined in a case that the transmitting coil and the receiving coil are coupled to each other in a predetermined coupling coefficient. The resonance-type contactless power supply provides a stable output voltage when operating in the predetermined frequency.

10 Claims, 3 Drawing Sheets

(51) Int. Cl.
*H01F 38/00* (2006.01)
*H02J 50/12* (2016.01)
*H02J 5/00* (2016.01)
H01F 38/14 (2006.01)
H02J 7/02 (2016.01)

(58) Field of Classification Search
USPC .......................................................... 307/104
See application file for complete search history.

(56) References Cited

U.S. PATENT DOCUMENTS

2013/0270919 A1\* 10/2013 Miller ..................... H01F 38/14
307/104
2014/0368056 A1\* 12/2014 Hosotani ................. H02J 5/005
307/104
2015/0015197 A1\* 1/2015 Mi ........................ B60L 11/182
320/108

\* cited by examiner

RESONANCE-TYPE CONTACTLESS POWER SUPPLY AND POWER RECEIVER

CLAIM OF PRIORITY

This application claims priority to Chinese Application No. 201410304391.6, filed Jun. 27, 2014 (published as CN 104037956 A), which is hereby incorporated by reference.

BACKGROUND OF THE INVENTION

Field of the Invention

The present disclosure relates to the field of power electronics, and more particularly, to a resonance-type contactless power supply and power receiver.

Description of the Related Art

Contactless power supply is widely used in electronic products, especially in low-power electronic products such as cellular phones, MP3 players, digital cameras, laptop computers, and the like, due to their convenience and availability. A conventional contactless power supply typically includes a transformer having a transmitting coil L1 and a receiving coil L2, and electric energy is typically transferred from a power transmitter to a power receiver by magnetic coupling between a primary coil and a secondary coil of the transformer.

During transmission of electric energy, inductance values of the transmitting coil and the receiving coil may be changed by the factors such as external obstacles (for example, a magnetic conductive object), a load of the power receiver, variations in an operating temperature of the circuit, and variations in locations of the coils. As a result, a resonance frequency of the resonance circuit is changed by variations in the inductance values of the transmitting coil and the receiving coil, and detuning occurs, which decreases significantly a transmission efficiency of the system.

The conventional wireless power supply system basically operates at a self-inductance resonance frequency of the system. The self-inductance resonance frequency of the system is a frequency at which impedances of a capacitor and self-inductance of a coil can be canceled out in the transmitter and the receiver. However, when operating at the self-inductance resonance frequency, the receiver will provide an unstable current to the load, have a low transmission efficiency, and introduce a complex control scheme.

BRIEF DESCRIPTION OF THE INVENTION

In view of this, the present disclosure provides a resonance-type contactless power supply and power receiver which can maintain a stable output voltage when coupling efficient varies and eliminate an adverse effect of detuning due to variations of a resonance frequency of the system on transmission efficiency.

In one embodiment, there is provided a resonance-type contactless power supply comprising:

a high-frequency power supply configured to provide a high-frequency AC current with a predetermined frequency;

a transmitter-side resonant circuit comprising a transmitting coil for receiving the high-frequency AC current from the high-frequency power supply;

a receiver-side resonant circuit comprising a receiving coil which is separated from but coupled to the transmitting coil in a contactless manner, and configured to receive electric energy from the transmitting coil; and a receiver-side parallel capacitor which is connected in parallel at an output terminal of the receiver-side resonant circuit, wherein the predetermined frequency is a leakage-inductance resonance frequency in a case that the transmitting coil and the receiving coil are coupled to each other in a predetermined coupling coefficient, and the receiver-side parallel capacitor has a capacitance value which is in inversely proportional to the product of a square of an angular frequency of the predetermined frequency and a predetermined mutual inductance which is determined in a case that the transmitting coil and the receiving coil are coupled to each other in the predetermined coupling coefficient.

Preferably, the receiver-side parallel capacitor has a capacitance value equal to $1/n\omega_1^2 L_M$, wherein $\omega_1$ is the angular frequency of the predetermined frequency, $L_M$ is the predetermined mutual inductance, and n is a value larger than or equal to 1.5 and smaller than or equal to 2.5.

Preferably, n is equal to 2.

Preferably, the receiver-side resonant circuit further comprises a resonant capacitor, and the predetermined frequency is equal to $$\frac{1}{2\pi\sqrt{(L_d - L_M)C_d}},$$

wherein $L_d$ is an inductance value of the receiving coil, $L_M$ is the predetermined mutual inductance value, $C_d$ is a capacitance value of the resonant capacitor in the receiver-side resonant circuit.

Preferably, the predetermined coupling coefficient is equal to $\sqrt{k_{min}k_{max}}$, wherein $k_{min}$ is a minimum value of the coupling coefficient, and $k_{max}$ is a maximum value of the coupling coefficient.

Preferably, the transmitter-side resonant circuit and the receiver-side resonant circuit have the same resonance frequency.

In another embodiment, there is provided a resonance-type contactless power receiver comprising:

a receiver-side resonant circuit comprising a receiving coil which is separated from but coupled to a transmitting coil in a contactless manner, the transmitting coil being energized by a high-frequency AC current having a predetermined frequency, and the receiver-side resonant circuit being configured to receive electric energy from the transmitting coil; and a receiver-side parallel capacitor which is connected in parallel at an output terminal of the receiver-side resonant circuit, wherein the predetermined frequency is a leakage-inductance resonance frequency in a case that the transmitting coil and the receiving coil are coupled to each other in a predetermined coupling coefficient, and the receiver-side parallel capacitor has a capacitance value which is in inversely proportional to the product of a square of an angular frequency of the predetermined frequency and a predetermined mutual inductance value which is determined in a case that the transmitting coil and the receiving coil are coupled to each other in the predetermined coupling coefficient.

Preferably, the receiver-side parallel capacitor has a capacitance value equal to $1/n\omega_1^2 L_M$, wherein $\omega_1$ is the angular frequency of the predetermined frequency, $L_M$ is the predetermined mutual inductance, and n is a value larger than or equal to 1.5 and smaller than or equal to 2.5.

Preferably, n is equal to 2.

Preferably, the receiver-side resonant circuit further comprises a resonant capacitor, and the predetermined frequency is equal to $$\frac{1}{2\pi\sqrt{(L_d - L_M)C_d}},$$

wherein $L_d$ is an inductance value of the receiving coil, $L_M$ is the predetermined mutual inductance value, $C_d$ is a capacitance value of the resonant capacitor in the receiver-side resonant circuit.

The resonance-type contactless power supply operates at a fixed frequency, by using a high-frequency power supply which outputs a high-frequency AC current with a predetermined frequency. Moreover, the resonance-type contactless power supply can maintain a stable output voltage when coupling efficient varies, by using a receiver-side parallel capacitor which has a predetermined capacitance value and is connected in parallel at an output terminal of the receiver-side resonant circuit.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS OF THE INVENTION

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which is electrically coupled to or electromagnetically coupled to other ones. When one component/circuit is referred to as being "connected to" another component, or one component/circuit is referred to as being "connected between" two nodes, it can be connected to or coupled to another component directly, or with an intermediate component therebetween. Connection of two components can be physical or logical one, or physical and logical one. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
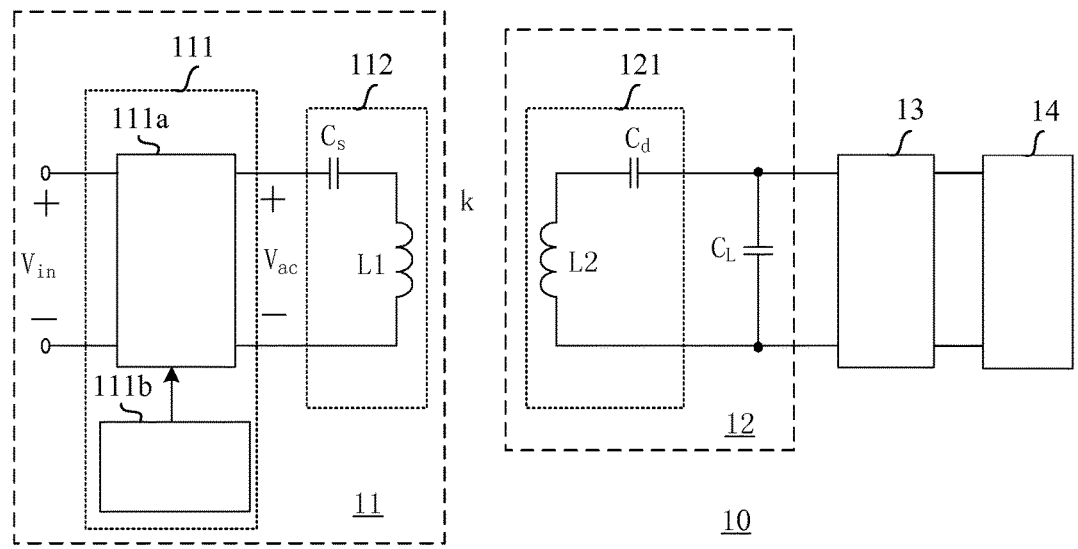
FIG. 1 is a schematic circuit diagram of an example resonance-type contactless power supply according to one embodiment of the present disclosure.

FIG. 1 is a schematic circuit diagram of an example resonance-type contactless power supply according to one embodiment of the present disclosure. As shown in FIG. 1, a resonance-type contactless power supply 10 includes a power transmitter 11 and a power receiver 12. The power receiver 12 provides an output voltage to a load 14 through a rectifier 13.

The power transmitter 11 includes a high-frequency power supply 111 and a transmitter-side resonant circuit 112. The high-frequency power supply 111 outputs a high-frequency AC current with a predetermined frequency. The transmitter-side resonant circuit 112 includes a transmitting coil L1 for receiving the high-frequency AC current from the high-frequency power supply 111, and then transferring electric energy to the power receiver 12 via the transmitting coil L1. The predetermined frequency is a leakage-inductance resonance frequency when the transmitting coil L1 and the receiving coil L2 are couple to each other with a predetermined coupling efficient.

In this embodiment, self-inductance of the transmitting coil and self-inductance of the receiving coil can be each decoupled to two portions, including leakage inductance and mutual inductance. The leakage-inductance resonance frequency is a resonance frequency at which impedances of leakage inductance and a resonant capacitor can be canceled out, both in the transmitter-side resonant circuit and in the receiver-side resonant circuit. When the circuit operates in the leakage-inductance resonance frequency, the system efficiency is optimized.

The power receiver 12 is coupled to the power transmitter 11 in a detachable and contactless manner for receiving electric energy. The power receiver 12 includes a receiver-side resonant circuit 121. The receiver-side resonant circuit 121 includes a receiving coil L2. The receiving coil L2 is coupled to the transmitting coil L1 in a detachable and contactless manner. The receiver-side resonant circuit 121 receives electric energy from the transmitting coil L1.

In this embodiment, the high-frequency power supply 111 may include an inverting circuit 111a and a control circuit 111b.

The inverting circuit 111a outputs a high-frequency AC current with a predetermined frequency in response to a control signal from the control circuit 111b. That is, an input DC current is converted into a high-frequency AC current.

The transmitter-side resonant circuit 112 includes the transmitting coil L1 for receiving the high-frequency AC current with the predetermined frequency from the high-frequency power supply 111. The transmitter-side resonant circuit 112 needs an additional transmitter-side resonant capacitor $C_s$ which is connected in series or in parallel with the transmitting coil L1 to provide a resonance circuit. The transmitter-side resonant capacitor $C_s$ is used for balancing leakage inductance of the transmitter-side resonant circuit 112, reflected inductance of the receiver-side resonant circuit 121 and parasitic inductance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonant capacitor so that an additional capacitor can be omitted in the circuit.

The power receiver 12 includes the receiver-side resonant circuit 121. The receiver-side resonant circuit 121 includes the receiving coil L2. The receiving coil L2 is coupled to the transmitting coil L1 in a detachable and contactless manner, with a coupling coefficient k. The receiving coil L2 receives electric energy from the transmitting coil L1. Meanwhile, the receiver-side resonant circuit 121 needs an additional receiver-side resonant capacitor $C_d$ for decreasing reactive power at receiver side and increasing active power transferred by magnetic coupling configuration. As mentioned above, one skilled in the art can understand that in some cases, distributed capacitance (for example, among wires of the coil) of other components in the circuit may be used as the receiver-side resonant capacitor $C_d$ so that an additional capacitor can be omitted in the circuit.

In this embodiment, the transmitter-side resonant circuit 112 and the receiver-side resonant circuit 121 have the same resonance frequency.

The power receiver 12 further includes a receiver-side parallel capacitor $C_L$ which is connected in parallel at an output terminal of the receiver-side resonant circuit 121.

The receiver-side parallel capacitor $C_L$ has a capacitance value which is in inversely proportional to the product $(\omega_1^2 L_M)$ of the square $(\omega_1^2)$ of an angular frequency of the predetermined frequency and a predetermined mutual inductance $L_M$. That is, the receiver-side parallel capacitor $C_L$ has a capacitance value $C_L=1/n\omega_1^2 L_M$.

The predetermined mutual inductance $L_M$ is mutual inductance when the transmitting coil L1 and the receiving coil L2 are couple to each other with a predetermined coupling efficient $k_{mid}$. The predetermined coupling efficient is given when one designs the circuit. Here, n is a value larger than or equal to 1.5 and smaller than or equal to 2.5.

Figure 2:
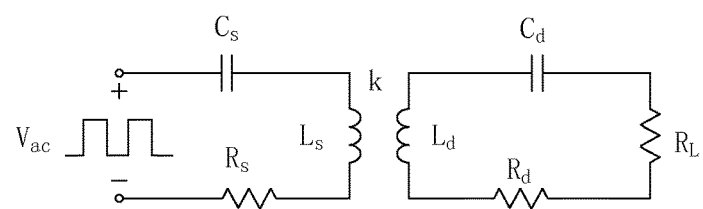
FIG. 2 is a schematic diagram showing a resonance and magnetic coupling circuit in the example resonance-type contactless power supply according to one embodiment of the present disclosure.

FIG. 2 is a schematic diagram showing a resonance and magnetic coupling circuit, i.e. a combination of the transmitter-side resonant circuit 112 and the receiver-side resonant circuit 121, in the example resonance-type contactless power supply according to one embodiment of the present disclosure.

As shown in FIG. 2, the transmitting coil L1 is equivalent to a first ideal coil $L_s$ and a coil resistor $R_s$, and the receiving coil L2 is equivalent to a second ideal coil $L_d$ and a coil resistor $R_d$. The first ideal coil $L_s$ is coupled to the second ideal coil $L_d$. In FIG. 2, the transmitter-side resonant circuit 112 and the receiver-side resonant circuit 121 each include a resonance resistor connected in series. The transmitter-side resonant circuit 112 further includes a transmitter-side resonant capacitor $C_s$, and the receiver-side resonant circuit 121 further includes a receiver-side resonant capacitor $C_d$. As mentioned above, the transmitter-side resonant capacitor $C_s$ and the receiver-side resonant capacitor $C_d$ may be achieved by additional components or distributed parameters of other components.

Thus, the resonance and magnetic coupling circuit constitutes a mutual-inductance coupling circuit.

Typically, the transmitter-side resonant circuit 112 and the receiver-side resonant circuit 121 have the same resonance frequency so that electric energy can be transferred in a resonant manner as follows, $$f_s = 1/2\pi \cdot \sqrt{L_s \cdot C_s} = 1/2\pi \cdot \sqrt{L_d \cdot C_d} = f_d$$

wherein $f_s$ is a resonance frequency of the transmitter-side resonant circuit 112, $f_d$ is a resonance frequency of the receiver-side resonant circuit 121, $L_s$ is an inductance value of the first ideal coil $L_s$, $L_d$ is an inductance value of the second ideal coil $L_d$, $C_s$ is a capacitance value of the transmitter-side resonant capacitor, and $C_d$ is a capacitance value of the receiver-side resonant capacitor.

Preferably, the inductance value of the first ideal coil $L_s$ may be set to be a value equal to the inductance value of the second ideal coil $L_d$, and the capacitance value $C_s$ of the transmitter-side resonant capacitor may be set to be a value equal to the capacitance value $C_d$ of the receiver-side resonant capacitor so that the receiver-side resonant capacitor 112 and the receiver-side resonant circuit 121 have the same resonance frequency.

Typically, the above resonance frequency is referred to as a self-inductance resonance frequency. When operating at the above resonance frequency, the receiver-side resonant capacitor 112 and the receiver-side resonant circuit 121 resonate simultaneously, and impedances of inductors and capacitors in the resonance and magnetic coupling circuit are canceled out. The system efficiency is thus optimized.

However, when detuning occurs, the circuit efficiency will be deteriorated.

Figure 3:
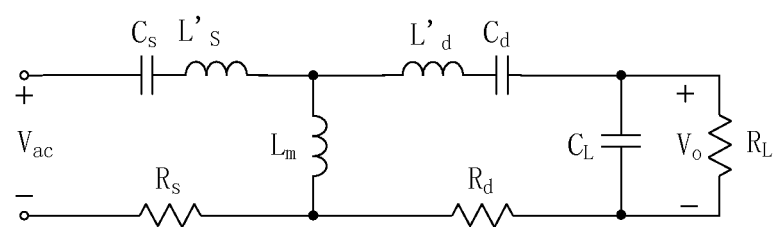
FIG. 3 is an equivalent circuit diagram of the resonance and magnetic coupling circuit shown in FIG. 2.

FIG. 3 is an equivalent circuit diagram of the resonance and magnetic coupling circuit shown in FIG. 2. Because the coupling of the transmitting coil L1 and the receiving coil L2 includes leakage inductance and mutual inductance, the magnetic coupling circuit as shown in FIG. 2 can be equivalent to the circuit as shown in FIG. 3, where the ideal coils $L_s$ and $L_d$ are coupled to each other but represented here by transmitter-side leakage inductance $L_s'$, receiver-side leakage inductance $L_d'$, and mutual inductance $L_m$.

Figure 4:
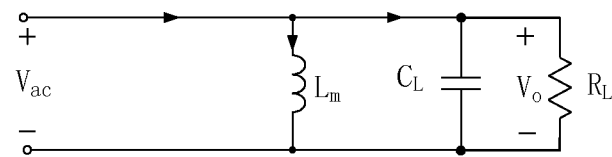
FIG. 4 is an equivalent circuit diagram of the resonance and magnetic coupling circuit shown in FIG. 2, when operating at a leakage-inductance resonance frequency.

FIG. 4 is an equivalent circuit diagram of the resonance and magnetic coupling circuit shown in FIG. 2, when operating at a leakage-inductance resonance frequency. As shown in FIG. 4, when operating at a leakage-inductance resonance frequency, impedances of the transmitter-side leakage inductance $L_s'$, the transmitter-side resonant capacitor $C_s$, the receiver-side leakage inductance $L_d'$, and the receiver-side resonant capacitor $C_d$ in the transmitter-side resonant circuit 112 and the receiver-side resonant circuit 121 are canceled out. The circuit is equivalent to a two-terminal network including only the mutual inductance $L_m$ and the coil resistor $R_s$ and $R_d$. In a case that the coil resistors $R_s$ and $R_d$ have small values and can be omitted, the mutual inductance $L_m$ may be seen as being connected in parallel at an output terminal. The resonance and magnetic coupling circuit can provide a stable output voltage which is substantially consistent with an input voltage, i.e. $V_o \approx V_{ac}$. The system operates at the leakage-inductance resonance frequency, and can be equivalent to a voltage source. However, the mutual inductance $L_m$ varies with the coupling coefficient k, and the leakage-inductance resonance frequency will also vary. The system needs an additional frequency tracking control circuit for detecting and tracking the current leakage-inductance resonance frequency so that the system always operates stably at the leakage-inductance resonance frequency. The frequency tracking control circuit leads to a complex system configuration and a difficult control scheme.

To simplify the system configuration, a receiver-side parallel capacitor $C_L$, with a capacitance value $C_L = 1/n\omega_1^2 L_M$, wherein $L_M$ is the predetermined mutual inductance value, is connected in parallel at an output terminal of the receiver-side resonant circuit 121. $\omega_1$ is an angular frequency corresponding to a predetermined frequency $f_1$. The predetermined frequency $f_1$ is a leakage-inductance resonance frequency when the mutual inductance in the circuit is equal to the predetermined mutual inductance $L_M$.

When the transmitting coil L1 and the receiving coil L2 are coupled to each other with a predetermined coupling coefficient $k_{mid}$, the mutual inductance $L_m$ is equal to the predetermined inductance value $L_M$, and the leakage-inductance resonance frequency of the circuit is equal to the predetermined frequency. The angular frequency is $\omega_1$. In such case, impedances of the transmitter-side leakage inductance $L_s'$, the transmitter-side resonant capacitor $C_s$, the receiver-side leakage inductance $L_d'$, and the receiver-side resonant capacitor $C_d$ in the transmitter-side resonant circuit 112 and the receiver-side resonant circuit 121 are canceled out, because the high-frequency power supply provides a high-frequency AC current with a frequency equal to the predetermined frequency $f_1$ to an input of the transmitter-side resonant circuit. The circuit is equivalent to a two-terminal network including only the mutual inductance $L_m$ and the coil resistors $R_s$ and $R_d$.

Preferably, when the coupling coefficient k varies in [$k_{min}$, $k_{max}$], the predetermined coupling coefficient $k_{mid}$ may be as follows, $$k_{mid} = \sqrt{k_{min} k_{max}}$$

wherein, $k_{min}$ is a minimum value of the coupling coefficient, and $k_{max}$ is a maximum value of the coupling coefficient. One skilled in the art can understand that the predetermined coupling coefficient can also be determined by multiple measurements or from an empirical formula.

The coupling coefficient k determines relations among mutual inductance, leakage inductance and coil inductance. In the example of the receiver-side resonant circuit, the mutual inductance $L_m = kL_d$, and the leakage inductance $L_d' = (1-k)L_d$.

In a case that the coil resistors $R_s$ and $R_d$ have small values and can be omitted, the mutual inductance $L_m$ may be seen as being connected in parallel at an output terminal, as shown in FIG. 4. The magnetic coupling circuit can provide a stable output voltage which is substantially consistent with an input voltage, i.e. $V_o \approx V_{ac}$, when the load has an equivalent impedance value far larger than an output impedance value of the resonance and magnetic coupling circuit (ie. $R_L \gg Z_{CL}$).

Referring back to the circuit as shown in FIG. 3, the leakage-inductance resonance frequency satisfies $$f_1 = \frac{1}{2\pi \sqrt{L_d, C_d}},$$

wherein $f_1$ is a leakage-inductance resonance frequency, $L_d'$ is a receiver-side leakage inductance, and $C_d$ is a receiver-side resonant capacitor. In view of the fact that the receiver-side leakage inductance is equal to receiving coil inductance minus mutual inductance, $L_d' = (L_d - L_M)$, when the mutual inductance $L_m$ is equal to the predetermined mutual inductance value $L_M$. Thus, the leakage-inductance resonance frequency satisfies $$f_1 = \frac{1}{2\pi \sqrt{(L_d - L_M) C_d}}.$$

Figure 5:
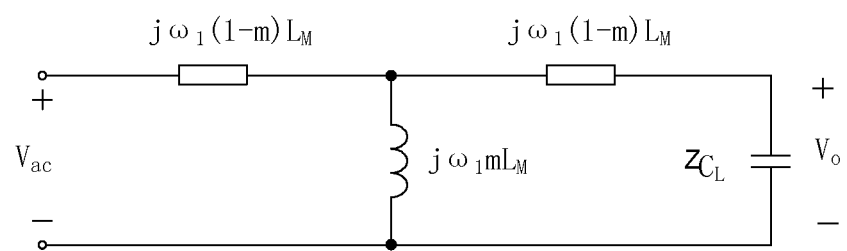
FIG. 5 is an equivalent circuit diagram of the resonance and magnetic coupling circuit during actual operation according to one embodiment of the present disclosure.

However, the coupling coefficient k varies in practical use with surrounding environment and relative position of the transmitting coil L1 and the receiving coil L2. Assuming the actual coupling coefficient k is in proportion to the predetermined coupling coefficient $k_{mid}$, $k = mk_{mid}$, wherein m is a proportion factor. When the coupling coefficient varies, impedances of the transmitter-side leakage inductance $L_s'$ and the transmitter-side resonant capacitor $C_s$ cannot be canceled out, if the high-frequency AC current provided to the input terminal of the transmitter-side resonant circuit has a fixed frequency. In such case, the circuit as shown in FIG. 3 is equivalent to the circuit as shown in FIG. 5, an impedance value of the transmitter side is $j\omega_1(1-m)L_M$, an impedance value of the receiver side is $j\omega_1(1-m)L_M$, and an impedance value of the mutual inductance is equal to $j\omega_1 m L_M$. Each impedance value is relevant to $\omega_1 L_M$. The receiver-side parallel capacitors has a capacitance value $C_L = 1/n\omega_1^2 L_M$, with a capacitive impedance value $Z_{CL} = -jn\omega_1 L_M$.

In such case, the circuit is simplified as a series-parallel network, and the relation between an input voltage $V_{ac}$ and an output voltage $V_o$ of the system can be determined from equivalent impedances and capacitive impedance values as follows, $$V_0 = \frac{mn}{m^2 + (n-1)} V_{ac}$$

Accordingly, the system has the input voltage $V_{ac}$ which is substantially equal to the output voltage $V_o$ even in a case that m varies in a certain range (i.e. the coupling coefficient k varies in a small range near the predetermined coupling $k_{mid}$), if the capacitance value of the receiver-side parallel capacitor $C_L$ is selected to have a suitable value.

In a case that m varies in a small range, a value range of n, for example in a range between 1.5 and 2.5, may be determined so that the system has the input voltage $V_{ac}$ which is substantially equal to the output voltage $V_o$. The value of n may be firstly determined in the range between 1.5 and 2.5, and then a suitable capacitance value of the receiver-side parallel capacitor may be determined therefrom.

Furthermore, in a case that m varies in the range between 0.75 and 1.5 and n=2, $$V_0 = \frac{m}{m^2 + 1} V_{ac}.$$

Figure 6:
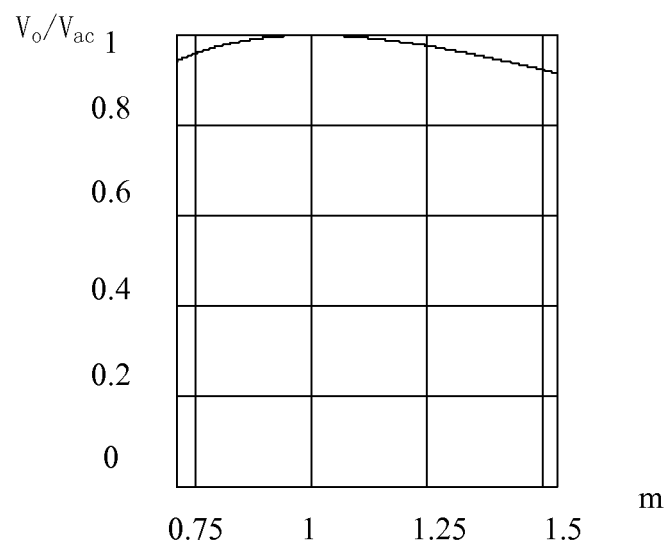
FIG. 6 is a curve diagram showing variations of $V_o/V_{ac}$ with m when n=2.

FIG. 6 is a curve diagram showing variations of $V_o/V_{ac}$ with m when n=2. As shown in FIG. 6, in a case that m varies in a small range and the coupling coefficient varies in a certain range, the system maintains a stable output voltage which is substantially equal to the input voltage.

In this embodiment, the receiver-side parallel capacitor $C_L$ is set to a predetermined value so that the resonance-type contactless power supply maintains a relatively high output voltage when the coupling coefficient varies in a certain range. The system can provide a stable output voltage when operating in a predetermined frequency.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A resonance-type contactless power supply comprising:
   a high-frequency power supply configured to provide a high-frequency AC current with a predetermined frequency;
   a transmitter-side resonant circuit comprising a transmitting coil for receiving said high-frequency AC current from said high-frequency power supply;
   a receiver-side resonant circuit comprising a receiving coil which is separated from but coupled to said transmitting coil in a contactless manner, and configured to receive electric energy from said transmitting coil; and
   a receiver-side parallel capacitor which is connected in parallel at an output terminal of said receiver-side resonant circuit,
   wherein said transmitting coil and said receiving coil are coupled to each other and each have self-inductance including leakage inductance and mutual inductance,
   said predetermined frequency is a leakage-inductance resonance frequency in a case that said transmitting coil and said receiving coil are coupled to each other in a predetermined coupling coefficient, and said receiver-side parallel capacitor has a capacitance value equal to $1/n\omega_1^2 L_M$, wherein $\omega_1$ is said angular frequency of said predetermined frequency, $L_M$ is a predetermined mutual inductance between said transmitting coil and said receiving coil, and n has a predetermined value,
   wherein said transmitter-side resonant and said receiver-side resonant circuit each have a resonant capacitor, and impedances of said leakage inductances and said resonant capacitors are canceled out at said leakage-inductance resonance frequency, both in said transmitter-side resonant circuit and in said receiver-side resonant circuit.

2. The resonance-type contactless power supply according to claim 1, wherein n has a value larger than or equal to 1.5 and smaller than or equal to 2.5.

3. The resonance-type contactless power supply according to claim 2, wherein n is equal to 2.

4. The resonance-type contactless power supply according to claim 1, wherein said predetermined frequency is equal to $$\frac{1}{2\pi\sqrt{(L_d - L_M)C_d}},$$

wherein $L_d$ is an inductance value of said receiving coil, $L_M$ is said predetermined mutual inductance, and $C_d$ is a capacitance value of said resonant capacitor in said receiver-side resonant circuit.

5. The resonance-type contactless power supply according to claim 1, wherein said predetermined coupling coefficient is equal to $\sqrt{k_{min}k_{max}}$, wherein $k_{min}$ is a minimum value of said coupling coefficient, and $k_{max}$ is a maximum value of said coupling coefficient.

6. The resonance-type contactless power supply according to claim 1, wherein said transmitter-side resonant circuit and said receiver-side resonant circuit have said same resonance frequency.

7. A resonance-type contactless power receiver comprising:
   a receiver-side resonant circuit comprising a receiving coil which is separated from but coupled to a transmitting coil in a contactless manner, said transmitting coil being energized by a high-frequency AC current having a predetermined frequency, and said receiver-side resonant circuit being configured to receive electric energy from said transmitting coil; and
   a receiver-side parallel capacitor which is connected in parallel at an output terminal of said receiver-side resonant circuit,
   wherein said transmitting coil and said receiving coil are coupled to each other and each have self-inductance including leakage inductance and mutual inductance,
   said predetermined frequency is a leakage-inductance resonance frequency in a case that said transmitting coil and said receiving coil are coupled to each other in a predetermined coupling coefficient, and said receiver-side parallel capacitor has a capacitance value equal to $1/n\omega_1^2 L_M$,
   wherein $\omega_1$ is said angular frequency of said predetermined frequency, $L_M$ is a predetermined mutual inductance between said transmitting coil and said receiving coil, and n has a predetermined value,
   wherein said receiver-side resonant circuit has a resonant capacitor, and impedances of said leakage inductance and said resonant capacitor are canceled out at said leakage-inductance resonance frequency, in said receiver-side resonant circuit.

8. The resonance-type contactless power receiver according to claim 7, wherein
   n has a value larger than or equal to 1.5 and smaller than or equal to 2.5.

9. The resonance-type contactless power receiver according to claim 8, wherein n is equal to 2.

10. The resonance-type contactless power receiver according to claim 7, wherein said predetermined frequency is equal to $$\frac{1}{2\pi\sqrt{(L_d - L_M)C_d}},$$

wherein $L_d$ is an inductance value of said receiving coil, $L_M$ is said predetermined mutual inductance, $C_d$ is a capacitance value of said resonant capacitor in said receiver-side resonant circuit.

* * * * *